United States Patent
Yang

(10) Patent No.: US 12,492,536 B1
(45) Date of Patent: Dec. 9, 2025

(54) VALVE ASSEMBLY

(71) Applicant: Tsai-Chen Yang, Taichung (TW)

(72) Inventor: Tsai-Chen Yang, Taichung (TW)

( * ) Notice: Subject to any disclaimer, the term of this patent is extended or adjusted under 35 U.S.C. 154(b) by 0 days.

(21) Appl. No.: 18/734,681

(22) Filed: Jun. 5, 2024

(51) Int. Cl.
  *E01C 1/02* (2006.01)
  *E03C 1/02* (2006.01)
  *E03C 1/042* (2006.01)
  *F16M 13/02* (2006.01)

(52) U.S. Cl.
  CPC .............. *E03C 1/042* (2013.01); *E03C 1/021* (2013.01); *F16M 13/02* (2013.01)

(58) Field of Classification Search
  CPC . E03C 1/021; E03C 1/02; E03C 1/042; E03C 2001/026; E03C 1/0408; E03C 1/0409; E03C 1/0401; E03C 1/0402; F16M 13/02
  USPC ........................................................ 248/200
  See application file for complete search history.

(56) References Cited

U.S. PATENT DOCUMENTS

| | | | | |
|---|---|---|---|---|
| 2,824,312 A * | 2/1958 | Tortorice | ................ | E03C 1/042 248/57 |
| 4,896,381 A * | 1/1990 | Hutto | ...................... | E03C 1/042 137/359 |
| 5,566,707 A * | 10/1996 | Ching | ..................... | E03C 1/042 137/359 |
| 5,755,247 A * | 5/1998 | Condon | .................. | E03C 1/021 137/15.17 |
| 5,934,032 A * | 8/1999 | Oberdorfer | ............. | E03C 1/021 52/220.8 |
| 6,206,028 B1 * | 3/2001 | Holden | ................. | F16K 5/0647 137/271 |
| 6,718,569 B2 * | 4/2004 | Burger | .................... | E03C 1/023 137/359 |
| 6,845,785 B1 * | 1/2005 | Condon | .................... | F16L 5/14 137/357 |
| 7,819,134 B2 * | 10/2010 | Izzy | ........................ | F16K 27/00 251/288 |
| 9,022,326 B2 * | 5/2015 | Brown | ...................... | F16L 3/08 248/65 |
| 9,518,381 B2 * | 12/2016 | Whitehead | .............. | E03C 1/021 |
| 9,650,768 B2 * | 5/2017 | Johnson | ................ | E03C 1/0408 |

(Continued)

FOREIGN PATENT DOCUMENTS

| | | | | |
|---|---|---|---|---|
| DE | 4345103 A1 * | 8/1994 | ............. | E04F 19/00 |
| EP | 2525000 A1 * | 11/2012 | ............. | E03C 1/021 |

(Continued)

*Primary Examiner* — Taylor Morris
(74) *Attorney, Agent, or Firm* — Muncy, Geissler, Olds & Lowe, P.C.

(57) ABSTRACT

A valve assembly is provided, wherein the valve assembly includes: a valve member; a base including a base portion, at least two columns and at least two through holes, the base portion including a first side and a second side opposite to each other, the first side being configured to be abutted on a mounting surface, the at least two columns being protrusive from the second side and configured to support the valve member, the at least two through holes being disposed through the first side and the second side respectively and configured for installation of at least two positioning members which are configured to be disposed through the at least two through holes and secured to the mounting surface; and at least two fasteners being disposed through the valve member and connected to the at least two columns respectively.

8 Claims, 6 Drawing Sheets

(56) References Cited

U.S. PATENT DOCUMENTS

| | | | | |
|---|---|---|---|---|
| 9,903,102 | B2* | 2/2018 | Zhou | E03C 1/04 |
| 10,309,084 | B2* | 6/2019 | Cipriani | F16K 21/00 |
| 11,118,331 | B2* | 9/2021 | Li | E03C 1/021 |
| 2005/0067017 | A1* | 3/2005 | Condon | F16L 5/14 |
| | | | | 137/360 |
| 2009/0126103 | A1* | 5/2009 | Dietrich | E03C 1/021 |
| | | | | 4/695 |
| 2010/0219310 | A1* | 9/2010 | Rose | E03C 1/021 |
| | | | | 248/224.8 |
| 2011/0290356 | A1* | 12/2011 | Yang | E03C 1/021 |
| | | | | 137/605 |
| 2014/0020173 | A1* | 1/2014 | Sargiani | E03C 1/01 |
| | | | | 4/670 |
| 2020/0354931 | A1* | 11/2020 | Li | E03C 1/04 |
| 2022/0112701 | A1* | 4/2022 | Wu | E03C 1/042 |

FOREIGN PATENT DOCUMENTS

| | | | |
|---|---|---|---|
| TW | M658992 U | * | 8/2024 |
| TW | M659429 U | * | 8/2024 |

\* cited by examiner

VALVE ASSEMBLY

BACKGROUND OF THE INVENTION

Field of the Invention

The present invention relates to a valve assembly.

Description of the Prior Art

Conventionally, the builder usually fixes a water valve directly to the wall or with a metal pad. However, every builder usually uses the metal pad that he is accustomed to using. As such, the fixation structures of the water valves and the stability of the water valve after construction are different from one another, resulting in the poor construction quality.

The present invention is, therefore, arisen to obviate or at least mitigate the above-mentioned disadvantages.

SUMMARY OF THE INVENTION

The main object of the present invention is to provide a valve assembly which can be firmly and reliably secured.

To achieve the above and other objects, the present invention provides a valve assembly is provided, wherein the valve assembly includes: a valve member; a base including a base portion, at least two columns and at least two through holes, the base portion including a first side and a second side opposite to each other, the first side being configured to be abutted on a mounting surface, the at least two columns being protrusive from the second side and configured to support the valve member, the at least two through holes being disposed through the first side and the second side respectively and configured for installation of at least two positioning members which are configured to be disposed through the at least two through holes and secured to the mounting surface; and at least two fasteners being disposed through the valve member and connected to the at least two columns respectively.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
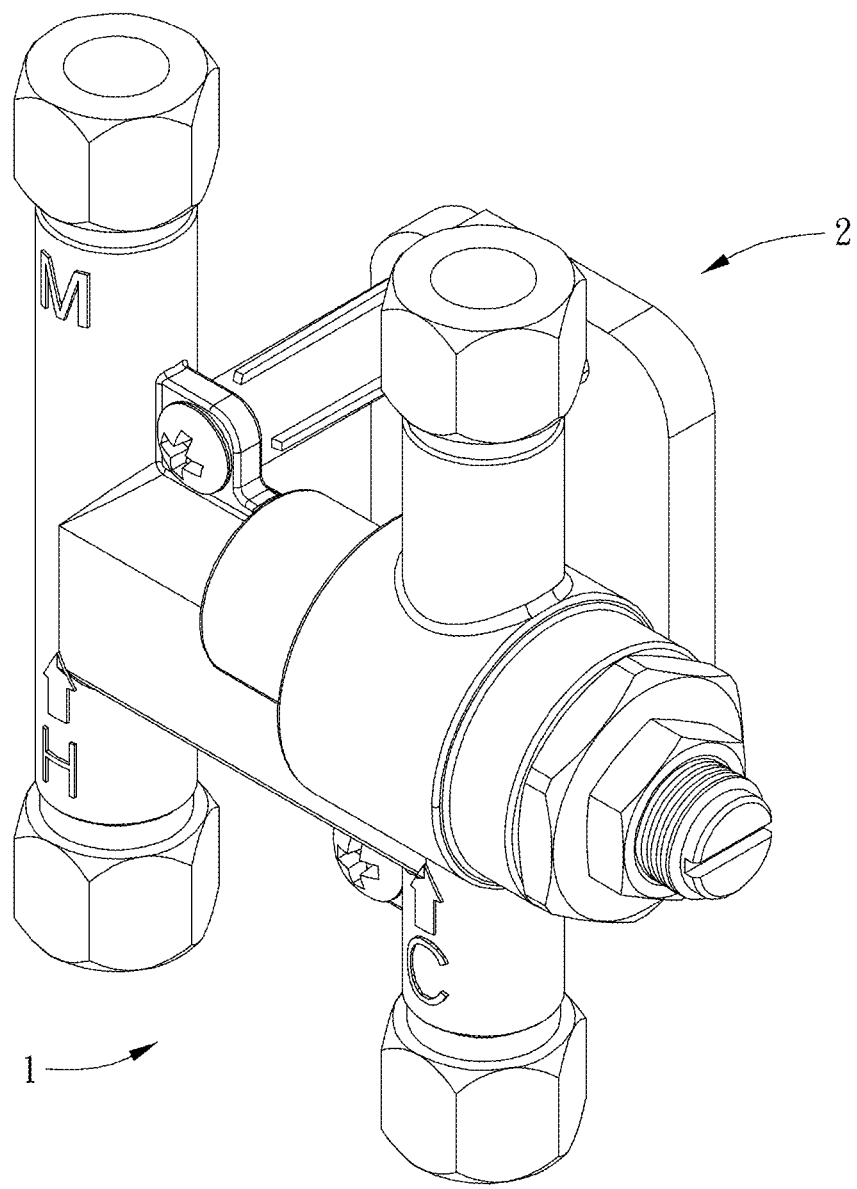
FIG. 1 is a stereogram of an exemplary embodiment of the present invention.
Figure 2:
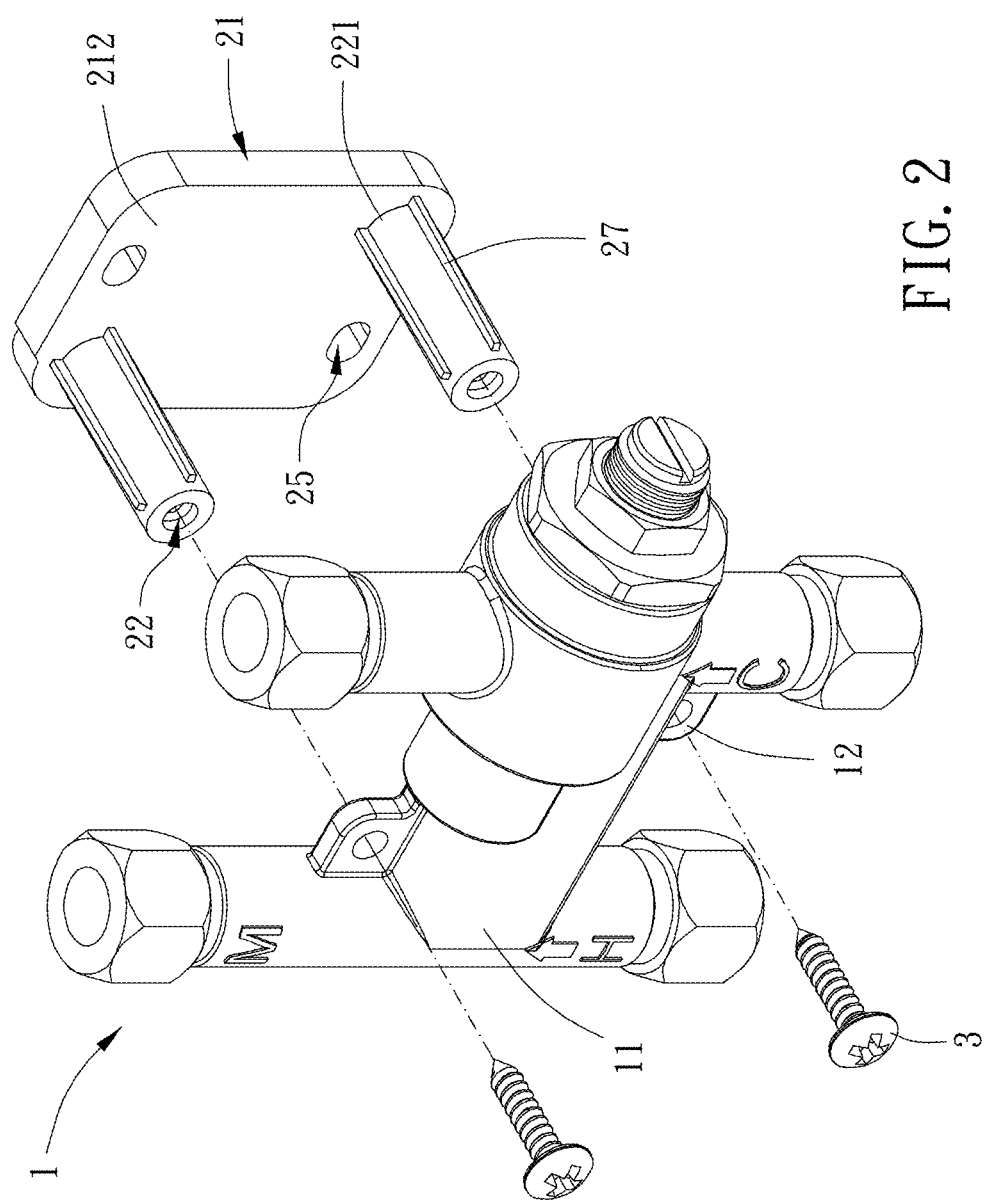
FIG. 2 is a breakdown drawing of an exemplary embodiment of the present invention.
Figure 3:
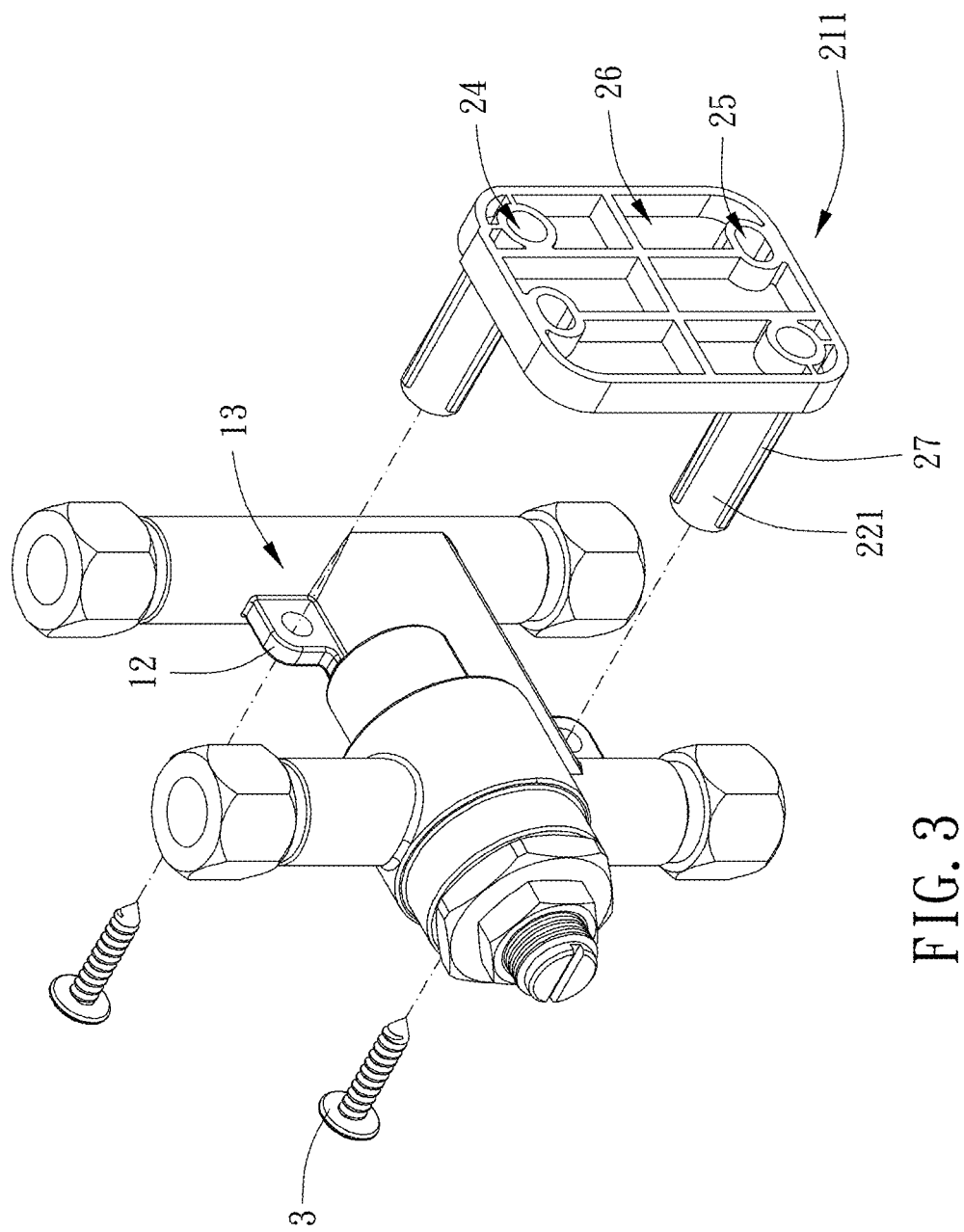
FIG. 3 is another breakdown drawing of an exemplary embodiment of the present invention.
Figure 4:
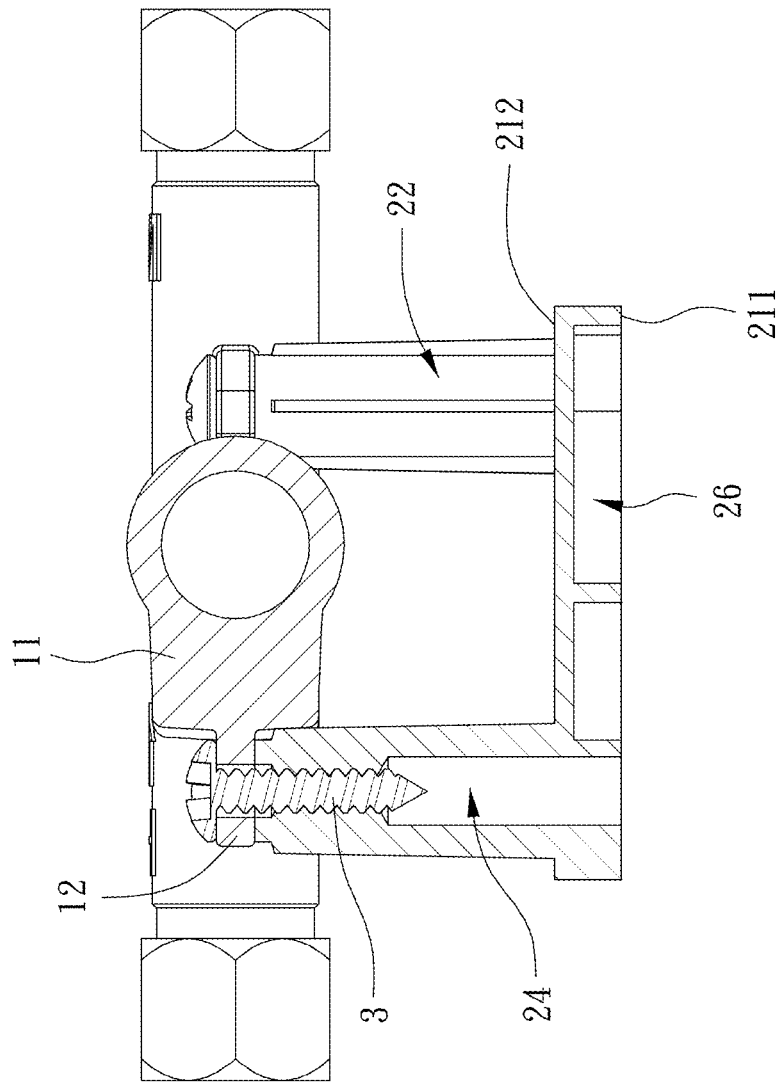
FIG. 4 is a cross-sectional view of an exemplary embodiment of the present invention.
Figure 5:
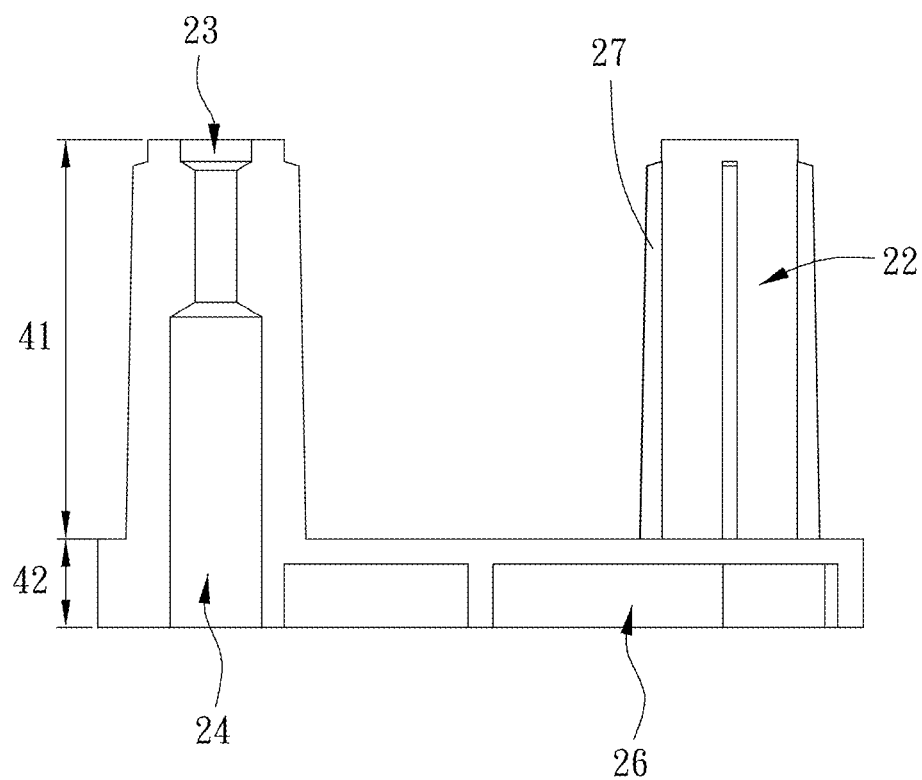
FIG. 5 is a drawing showing a base of an exemplary embodiment of the present invention.
Figure 6:
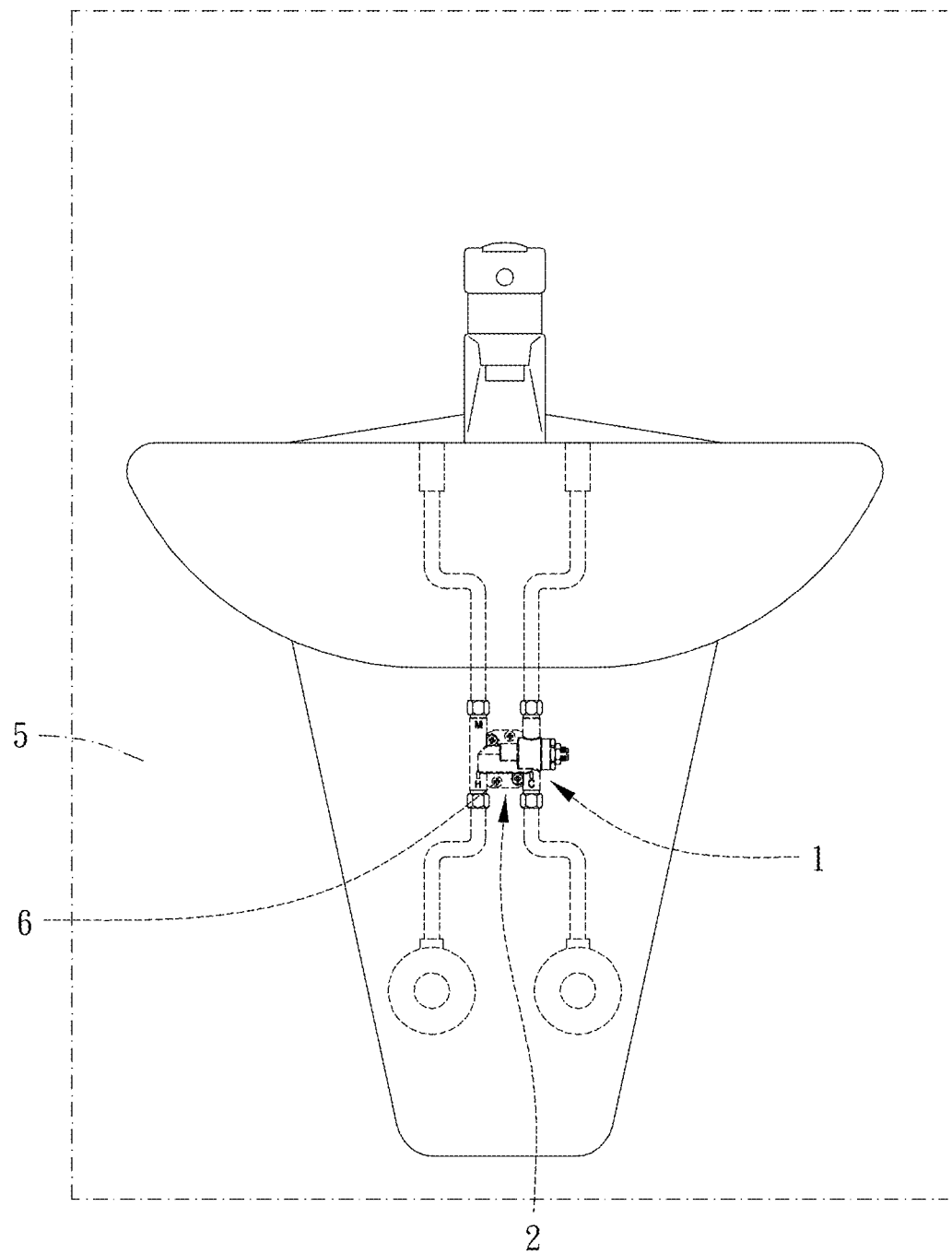
FIG. 6 is a drawing showing application of a valve assembly of an exemplary embodiment of the present invention.

Please refer to FIGS. 1 to 6 for an exemplary embodiment of the present invention. A valve assembly of the present invention includes a valve member 1, a base 2 and at least two fasteners 3.

The base 2 includes a base portion 21, at least two columns 22 and at least two through holes 25, the base portion 21 includes a first side 211 and a second side 212 opposite to each other, the first side 211 is configured to be abutted on a mounting surface 5 (such as a wall surface), the at least two columns 22 are protrusive from the second side 212 and configured to support the valve member 1, and the at least two through holes 25 are disposed through the first side 211 and the second side 212 respectively and configured for installation of at least two positioning members 6 (such as screws) which are configured to be disposed through the at least two through holes 25 and secured to the mounting surface 5. The at least two fasteners 3 are disposed through the valve member 1 and connected to the at least two columns 22 respectively so that the valve member 1 is firmly and reliably secured to the base 2.

Preferably, the base 2 further includes at least one recess 26 disposed on the first side 211, such that the structure at the first side 211 is more flexible so that the installer can shape it accordingly according to the outline of the mounting surface 5, and provides more space for grip of the installer's fingers when taking it, thereby increasing the holding stability. In this embodiment, the at least one recess includes a plurality of recesses 26, and the plurality of the recesses 26 are partitioned.

The at least two columns 22 can not only support the valve member 1, but also maintain a distance between the valve member 1 and the mounting surface 5, thus providing more space for hand tools to extend into the valve member 1 for fine adjustments so that it can facilitate the hand tool to drive the nut. Moreover, the at least two columns 22 push the valve member 1 away from the mounting surface 5, which can increase the contact area between the valve member 1 and the air, which is conducive to air convection to help the valve member 1 dissipate heat quickly.

Preferably, an outer surface 221 of each of the at least two columns 22 includes a plurality of ribs 27, and the plurality of ribs 27 extend equiangularly from the outer surface 221, and each of the plurality of ribs 27 is connected to the second side 212, which provides good structural strength of the columns 22 to stably support the valve member 1.

In this embodiment, the at least two through holes includes two through holes 25, the at least two columns includes two columns 22, and the two through holes 25 and the two columns 22 are alternatively and circumferentially arranged on the base portion 21. Preferably, the two through holes 25 are oval, thus allowing various mounting positions of the positioning member 6. An axial dimension of each of the at least two columns 22 is defined as a first dimension 41, an axial dimension of the base portion 21 is defined as a second dimension 42, and the first dimension 41 is at least three times the second dimension 42 to provide more spacing.

Specifically, the valve member 1 includes a main body 11 and at least two abutting portions 12, the at least two abutting portions 12 project from the main body 11, each of the at least two abutting portions 12 and the main body 11 define a receiving space 13 which one of the at least two columns 22 is partially within. Preferably, each of the at least two columns 22 is axially abutted against one of the at least two abutting portions 12 and radially abutted against the main body 11 so that the column 22 can provide support to the valve member 1 in two different directions.

Specifically, the at least two fasteners 3 are screwed to the at least two columns 22, each of the at least two columns 22 includes an assembling hole 23 and a chamber 24, the assembling hole 23 and the chamber 24 are in communication with each other, the chamber 24 is located between the assembling hole 23 and the first side 211, the assembling hole 23 is configured to be connected with one of the least two fasteners 3, and the chamber 24 is configured to receive a portion of one of the least two fasteners 3. In other words, the column 22 can be adapted to the screw connection of the fastener 3 of various lengths. The chamber 24 has an axial dimension larger than an axial dimension of the assembling hole 23, and the chamber 24 is disposed through the first side 211.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A valve assembly including:
    a valve member;
    a base including a base portion, at least two columns and at least two through holes, the base portion including a first side and a second side opposite to each other, the first side being configured to be abutted on a mounting surface, the at least two columns being protrusive from the second side and configured to support the valve member, the at least two through holes being disposed through the first side and the second side respectively and configured for installation of at least two positioning members which are configured to be disposed through the at least two through holes and secured to the mounting surface; and
at least two fasteners being disposed through the valve member and connected to the at least two columns respectively
    wherein the valve member includes a main body and at least two abutting portions, the at least two abutting portions project from the main body, each of the at least two abutting portions and the main body define a receiving space, and the column is partially within the receiving space, and
    wherein each of the at least two columns is axially abutted against one of the at least two abutting portions and radially abutted against the main body.

2. The valve assembly of claim 1, wherein an outer surface of each of the at least two columns includes a plurality of ribs, and each of the plurality of ribs is connected to the second side.

3. The valve assembly of claim 1, wherein the base further includes at least one recess disposed on the first side.

4. The valve assembly of claim 1, wherein the at least two through holes includes two through holes, the at least two columns includes two columns, and the two through holes and the two columns are alternatively and circumferentially arranged on the base portion.

5. The valve assembly of claim 1, wherein the at least two fasteners are screwed to the at least two columns.

6. The valve assembly of claim 5, wherein each of the at least two columns includes an assembling hole and a chamber, the assembling hole and the chamber are in communication with each other, the chamber is located between the assembling hole and the first side, the assembling hole is configured to be connected with one of the least two fasteners, and the chamber is configured to receive a portion of one of the least two fasteners.

7. The valve assembly of claim 6, wherein the chamber has an axial dimension larger than an axial dimension of the assembling hole.

8. The valve assembly of claim 7, wherein an outer surface of each of the at least two columns includes a plurality of ribs, and each of the plurality of ribs is connected to the second side; the base further includes at least one recess disposed on the first side; the at least two through holes includes two through holes, the at least two columns includes two columns, and the two through holes and the two columns are alternatively and circumferentially arranged on the base portion; the at least two through holes are ovular; an axial dimension of each of the at least two columns is defined as a first dimension, an axial dimension of the base portion is defined as a second dimension, and the first dimension is at least three times the second dimension; the plurality of ribs extend equiangularly from the outer surface; the at least one recess includes a plurality of recesses, and the plurality of the recesses are partitioned; the chamber is disposed through the first side.

* * * * *